United States Patent [19]
Yosefi et al.

[11] Patent Number: 5,568,595
[45] Date of Patent: Oct. 22, 1996

[54] METHOD FOR GENERATING ARTIFICIAL SHADOW

[75] Inventors: Hanan Yosefi, Rishon Lezion; Shimon R. Armoni, Netanya, both of Israel

[73] Assignee: Scitex Corporation Ltd., Herzliya, Israel

[21] Appl. No.: 538,767

[22] Filed: Oct. 5, 1995

Related U.S. Application Data

[63] Continuation of Ser. No. 56,077, Apr. 30, 1993, abandoned.

[51] Int. Cl.$^6$ .................................................. G09B 9/08
[52] U.S. Cl. .................................................. 395/126
[58] Field of Search .............................. 395/126, 119, 395/120

[56] References Cited

U.S. PATENT DOCUMENTS

| | | | |
|---|---|---|---|
| 4,862,391 | 8/1989 | Ohhashi | 395/126 |
| 4,866,637 | 9/1989 | Gonzalez-Lopez et al. | 395/126 |
| 5,043,922 | 8/1991 | Matsumoto | 395/126 X |
| 5,083,287 | 1/1992 | Obata et al. | 395/126 |
| 5,222,203 | 6/1993 | Obata | 395/126 |
| 5,299,298 | 3/1994 | Elmquist et al. | 395/126 X |
| 5,377,313 | 12/1994 | Scheibl | 395/126 X |

OTHER PUBLICATIONS

Hsu P. et al. "Superposing Images with Shadow Casting", Proceedings of the First IEEE Conference on Visualization. Visualization '90. San Francisco, CA, 23–26 Oct. 1990, ISBN 0-8186-2083-8, Los Alamitos, CA. IEEE Comp. Soc. Press, pp. 298–306.

Jansen F. W. et al., "A Shadow Algorithm for CSG", Computers & Graphics, 1991, UK, vol. 15, No. 2, ISSN 0097-8493, pp. 237–247.

Roy G. G., et al "SR: A PC–based CAD System for Shadow and Reflection Studies in the Built Environment", Computer Aided Design, Oct. 1989, UK, vol. 21, No. 8, ISSN 0010-4485, pp. 497–504.

"Method to Permit Selective Shading of Graphic Object", Research Disclosure, No. 257, Sep. 1985, UK, p. 423.

*Primary Examiner*—Heather R. Herndon
*Assistant Examiner*—Cliff N. Vo
*Attorney, Agent, or Firm*—Ladas & Parry

[57] ABSTRACT

A system and method for producing a two dimensional color image with an artificial shadow, the image having elements stored at least in a first format and in a second format. A user designates at least an area in the image in which the object to be shadowed resides, an area in the image in which the shadow is to be generated and at least one shadow characteristic. An artificial shadow is generated in accordance with the user input. Elements stored in the first format are manipulated in accordance with the artificial shadow, the user input and the second format. Elements stored in the second format are manipulated in accordance with the user input. A relationship between the manipulated elements in the first format and the manipulated elements in the second format is determined and the image including with the artificial shadow is generated therefrom.

8 Claims, 8 Drawing Sheets

METHOD FOR GENERATING ARTIFICIAL SHADOW

This application is a continuation of application Ser. No. 08/056,077 filed on Apr. 30, 1993, now abandoned.

FIELD OF THE INVENTION

The present invention relates to apparatus and methods for generating an image of an object with shadow.

BACKGROUND OF THE INVENTION

It is often desirable to generate an artificial shadow for an image. Conventionally, one of two methods are often employed to generate an artificial shadow for an object.

Using the first method, the following three steps may be performed:

a. a control file is generated indicating the border or contours of the desired shadow area and the border or contour of the object. This step may be carried out using the MASK function on the Prisma workstation, commercially available from Scitex Corporation.

b. A degrade' or vignette is generated in a separate file according to the contour defined by the control file. The step may be carried out using the INTERACTIVE CT CREATE function on the Prisma workstation. Typically, a dark color value is selected for the border of the shadow contour which is intended to be adjacent to the object and a light color value is selected for the portion of the border of the shadow contour which is not intended to be adjacent to the object.

c. Finally, the degrade' file and the file containing the original object are merged into a single file.

The second method involves use of an airbrush to draw the shadow by hand. This method requires considerable artistic ability and coordination.

A third method employs a function called TPVN (two-point vignette) on Scitex's Imager workstation. The method is generally similar to the airbrush method in that artistic ability and coordination are required. The TPVN function allows a user to manually manipulate a vignette with two adjustable ends.

Systems which provide shadowing for imaged three-dimensional objects, about which three-dimensional information is available, are commercially available from companies such as Pixer, Softimage and Renderman.

SUMMARY OF THE INVENTION

The present invention seeks to provide an improved integrated color electronic pre-press system having a customized capability to generate artificial shadowing for images.

There is thus provided, in accordance with a preferred embodiment of the present invention, a method for generating artificial shadow including the steps of receiving an indication of a shadow unprotected area and a shadow protected area, together defining a total shadow area, computing shadow values for each location of the shadow unprotected area based on a shadow pattern which covers the total shadow area, and generating an image characterized in that the shadow values computed in the computing step are assigned only to the shadow unprotected area.

There is also provided, in accordance with another preferred embodiment of the present invention, a method for generating artificial shadow including the steps of receiving an indication of a plurality of objects within a single scene, and generating an image including the plurality of objects, and a corresponding plurality of shadow areas.

There is also provided, in accordance with another preferred embodiment of the present invention, a method for generating an artificially shadowed image, the method including the steps of prompting a user to provide an image of a scene including a two-dimensional representation of at least one object, prompting a user to indicate at least one shadow characteristic, and modifying the image of the scene so as to add a two-dimensional shadow, having the at least one shadow characteristic, for the at least one object.

There is further provided, in accordance with a further preferred embodiment of the present invention, an integrated color electronic pre-press system including a plurality of differently formatted two-dimensional image manipulation modes including at least a first mode operative to store and manipulate image information represented in a first format and a second mode operative to store and manipulate image information represented in a second format, and an artificially shadowed image-generating mode operative to prompt a user to provide, and to subsequently receive, an indication of a two-dimensionally represented object in a scene, wherein the artificially shadowed image-generating mode interacts with both of the first and second modes in order to generate an image of the scene wherein the object is artificially shadowed.

There is also provided, in accordance with another preferred embodiment of the present invention, a method for introducing an artificial shadowing capability into an integrated color electronic pre-press system, the method including the steps of modifying a plurality of differently formatted image manipulation modes including at least a first mode operative to store and manipulate image information represented in a first format and a second mode operative to store and manipulate image information represented in a second format, and providing an artificially shadowed image-generating unit interacting with both of the first and second modes in order to generate an image including at least one object and at least one shadow thereof.

There is additionally provided, in accordance with yet another preferred embodiment of the present invention, apparatus for generating artificial shadow for an image, the apparatus including an automatic artificial shadow adding unit operative to automatically add an artificial shadow to an original image without having to receive an image of the artificial shadow, and an image output unit operative to provide an output indication of the image generated by the automatic artificial shadow adding unit.

Further in accordance with a preferred embodiment of the present invention, the apparatus includes a shadow characteristic input unit operative to prompt a user to provide, and operative subsequently to receive, at least one shadow characteristic and wherein the artificial shadow added by the automatic artificial shadow adding unit conforms to the at least one shadow characteristic.

Further in accordance with a preferred embodiment of the present invention, the first and second image manipulation modes include at least two of the following three image manipulation modes:

a mode operative to store and manipulate image information represented in raster format, a mode operative to store and manipulate image information represented in run length-encoded format, and a layout and format unification control mode operative to store and lay out image information represented in a plurality of formats.

Further in accordance with a preferred embodiment of the present invention, the shadow pattern is defined by at least one dark color value, at least one bright color value and a brightness curve extending therebetween.

There is also provided, in accordance with a preferred embodiment of the present invention, a method for generating artificial shadow including the steps of receiving at least one user-selected characteristic of an artificial shadow for an imaged object, and automatically providing a low resolution preview of the imaged object together with an artificial shadow having the at least one user-selected characteristic.

There is additionally provided, in accordance with a preferred embodiment of the present invention, a method for generating artificial shadow for an imaged object within an underlying image, the method including the steps of receiving from a user, at least one color value for an artificial shadow, wherein the at least one color values are defined within at least one color separation, receiving an indication of an object area and of a shadow area, generating a mask image which is transparent, within the object area, to the color values in the underlying image, transparent, within the shadow area, to the at least one color separation within which the at least one color values are defined, and opaque, within the shadow area, to the remaining color separations.

Further in accordance with a preferred embodiment of the present invention, the step of generating includes the step of updating a previous mask image.

Still further in accordance with a preferred embodiment of the present invention, at least one of the shadow protected area and the shadow unprotected area is a disjoint area including a plurality of regions.

There is also provided, in accordance with another preferred embodiment of the present invention, apparatus for generating artificial shadow including a user input module operative to receive an indication of a shadow unprotected area and a shadow protected area, together defining a total shadow area, a shadow computational unit operative to compute shadow values for each location of the shadow unprotected area based on a shadow pattern which covers the total shadow area, and an artificially shadowed image generator operative to generate an image characterized in that the shadow values computed by the shadow computational unit are assigned only to the shadow unprotected area.

There is further provided, in accordance with another preferred embodiment of the present invention, apparatus for generating artificial shadow including a user input module operative to receive an indication of a plurality of objects within a single scene, and an artificial shadow generator operative to generate an image including the plurality of objects, and a corresponding plurality of shadow areas.

There is also provided, in accordance with a further preferred embodiment of the present invention, apparatus for generating an artificially shadowed image, the apparatus including a user prompting/user input receiving unit operative to prompt a user to provide an image of a scene including a two-dimensional representation of at least one object and to prompt a user to indicate at least one shadow characteristic, and an artifical shadow generator operative to modify the image of the scene so as to add a two-dimensional shadow, having the at least one shadow characteristic, for the at least one object.

There is also provided, in accordance with another preferred embodiment of the present invention, a method for generating artificial shadow for an image, the method including the steps of automatically adding an artificial shadow to an original image without having to receive an image of the artificial shadow, and providing an output indication of the image generated by the adding step.

Further in accordance with a preferred embodiment of the present invention, the method also includes the step of prompting a user to provide, and subsequently receiving, at least one shadow characteristic and wherein the artificial shadow conforms to the at least one shadow characteristic.

Further in accordance with a preferred embodiment of the present invention, the shadow pattern is defined by at least one dark color value, at least one bright color value and a brightness curve extending therebetween.

There is also provided, in accordance with another preferred embodiment of the present invention, apparatus for generating artificial shadow including a user input module operative to receive at least one user-selected characteristic of an artificial shadow for an imaged object, and a low resolution preview generator operative to automatically provide a low resolution preview of the imaged object together with an artificial shadow having the at least one user-selected characteristic.

There is also provided, in accordance with another preferred embodiment of the present invention, apparatus for generating artificial shadow for an imaged object within an underlying image, the apparatus including a mask image generator operative to generate a mask image which is transparent, within an object area, to the color values in the underlying image, transparent, within a shadow area, to at least one color separation within which at least one user-selected artificial shadow color values are defined, and opaque, within the shadow area, to the remaining color separations within which no user-selected artificial shadow color values are defined.

Further in accordance with a preferred embodiment of the present invention, the mask image generator generates the mask image by updating a previous mask image.

Still further in accordance with a preferred embodiment of the present invention, at least one of the shadow protected area and the shadow unprotected area is a disjoint area including a plurality of regions.

Further in accordance with a preferred embodiment of the present invention, the at least one shadow characteristic includes at least one of the following shadow characteristics: a dark point, a bright point, a brightness curve, location of a shadow protected area, a shadow-underlying image combining factor, and a graininess factor.

BRIEF DESCRIPTION OF THE DRAWINGS

The present invention will be understood and appreciated from the following detailed description, taken in conjunction with the drawings in which.

Attached herewith is the following appendix which aids in the understanding and appreciation of one preferred embodiment of the invention shown and described herein:

DETAILED DESCRIPTION OF PREFERRED EMBODIMENTS

Figure 1:
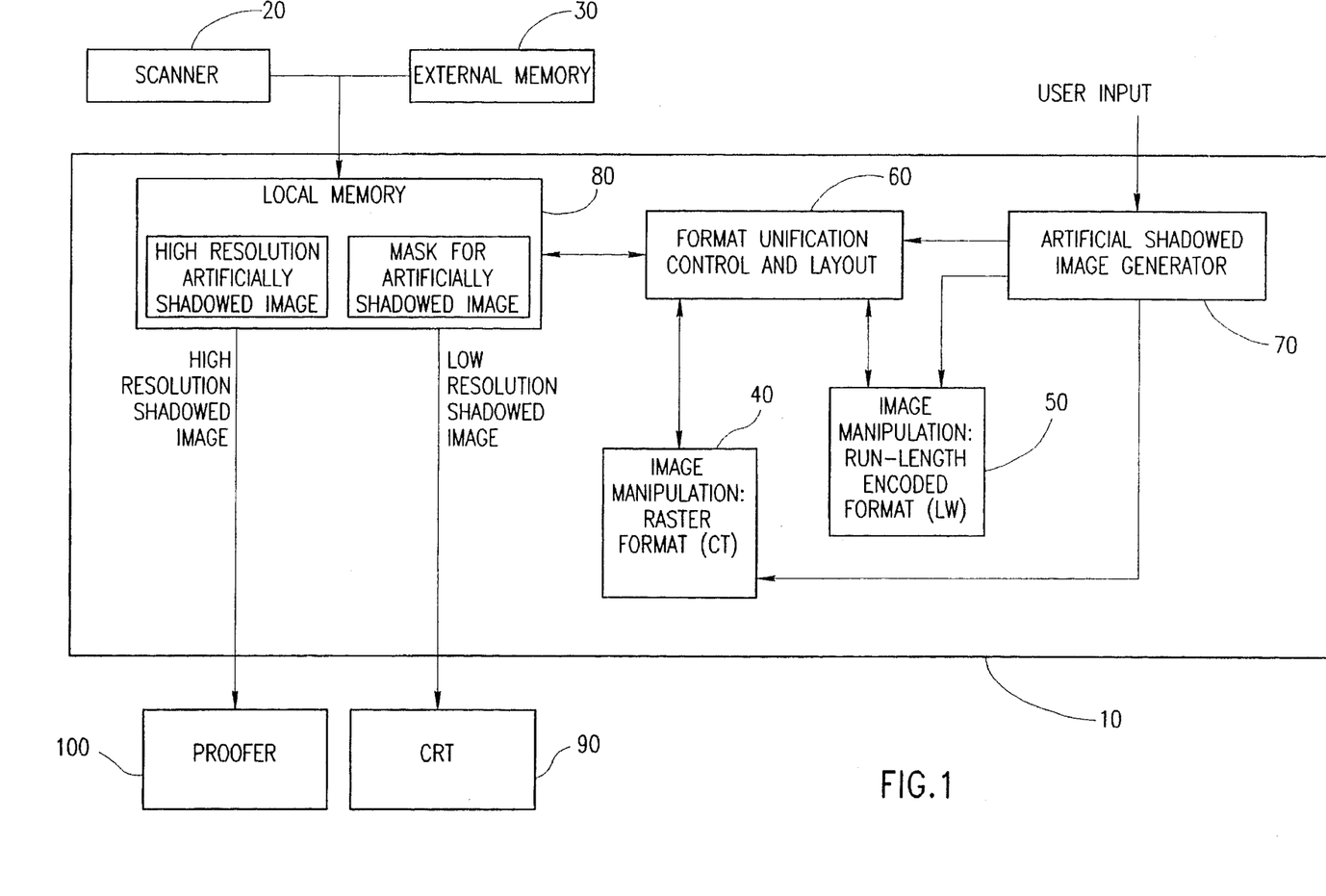
FIG. 1 is a simplified block diagram of pre-press apparatus including an integrated color electronic pre-press system, constructed and operative in accordance with a preferred embodiment of the present invention and having a customized capability to generate artificial shadowing for images.

Reference is now made to FIG. 1 which is a simplified block diagram of pre-press apparatus including an integrated color electronic pre-press system 10, constructed and operative in accordance with a preferred embodiment of the present invention and having a customized capability to generate artificial shadowing for images.

The color electronic pre-press system 10 is operative to generate images and also to receive existing images from an external source. For example, a scanned image may be received from a scanner 20 such as a Smart Scanner, commercially available from Scitex Corporation, Herzlia, Israel, or an image may be receieved from a similar color electronic pre-press system. Images may also be received via an external memory 30 such as a hard disk.

Pre-press system 10 typically is operative in a plurality of image manipulation modes, which may, for example, include the following modes:

a. a first mode 40 operative to store and manipulate image information represented in raster format;
b. a second mode 50 operative to store and manipulate image information represented in run length-encoded format; and
c. a layout and format unification control mode 60 operative to store and lay out image information represented in a plurality of formats, such as the formats of modes 40 and 50.

An artificially shadowed image generator 70 is operative to prompt a user to indicate at least one shadow characteristic, to receive the at least one shadow characteristic, and to automatically add, by interacting with all of modes 40, 50 and 60, an artificial shadow to an original image designated by the user without having to receive an image of the artificial shadow.

It is appreciated that artificial shadow may be added to any suitable original image, including, for example, a final layout.

The artificially shadowed image may be stored in a local memory 80 and may subsequently be displayed or printed. For example, a low resolution representation of the artificially shadowed image may be displayed on a CRT display 90. Once the user has viewed and approved the artificially shadowed image as displayed on CRT 90, a hard copy of the image may be generated by a proofer 100 such as the Iris 4012 proofer, marketed by Scitex Corporation, Herzlia, Israel.

A particular feature of the present invention is that a single integrated system is provided which includes a customized subsystem operative to perform all steps necessary for artificially generating shadow, rather than employing a combination of independent subsystems to carry out the various steps required to artificially generate shadow. The single integrated system provides a synergism between the various steps which is not possible when a combination of independent subsystems is employed.

A particular advantage of the synergism provided in the present invention is automatic provision of a low resolution preview of the imaged object together with the artificial shadow. This capability is extremely convenient for the user since it enables the user to rapidly, easily and interactively modify the artificial shadow as dictated by the appearance of the previewed image.

Another particular advantage of the synergism provided in the present invention is that a mask for the artificially shadowed image may be automatically modified in accordance with a user's selection of color characteristics for the shadow.

For example, the user may select the following dark and bright points for the shadow, defined in CMYK: (0,0,0, 60) and (0,0,0,0). The system shown and described herein will preferably automatically generate a mask characterized in that the shadow area is transparent to the K (black) separation and opaque to the C, M and Y separations, because the C, M and Y separations were not employed by the user to define the shadow.

A preferred method for implementing artificial shadowed image generator 70 of FIG. 1 is now described with reference to the flowchart of FIG. 2.

Figure 2:
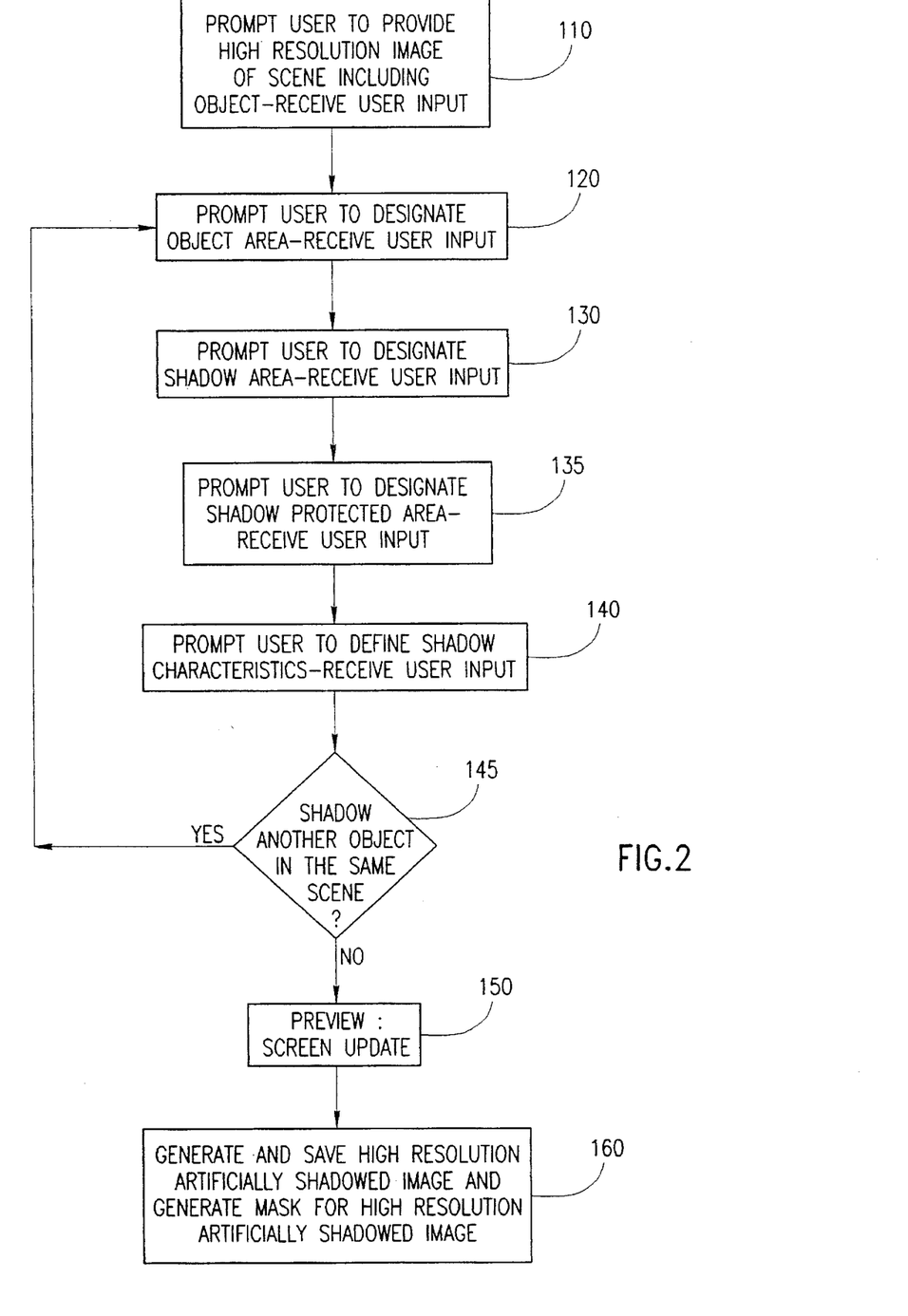
FIG. 2 is a simplified flow chart of a method suitable for implementing the customized artificial shadowing capability of the apparatus of FIG. 1.

The method of FIG. 2 preferably includes the following steps:

STEP 110: The user is prompted to provide, and the system subsequently accepts an indication of, a high resolution image of a scene, as for example from scanner 20 or external memory 30. The scene includes at least one object for which an artificial shadow is to be generated.

STEP 120: The user is prompted to define, and the system subsequently accepts the user's indication of, the area within the high resolution image in which the object to be shadowed resides. For example, the user may define the object area by selecting a mask, including a plurality of regions, for the selected scene and indicating a first region within the selected mask.

STEP 130: The user is prompted to define, and the system subsequently accepts the user's indication of, the area within the high resolution image in which the shadow is to reside. For example, the user may define the shadow area by indicating a second region within the selected mask.

STEP 135: The user is prompted to define, and the system subsequently accepts the user's indication of, an area within the high resolution image which is termed herein "the shadow protected area". For example, the user may define the shadow-protected area by indicating a third region within the selected mask.

Steps 120, 130 and 135 may each include the steps of drawing and designating, and the three drawing steps may be performed before the three designating steps. In other words, the user may employ a drawing tool such as the MASK function on the Scitex Whisper workstation in order to outline object, shadow, and, optionally, shadow protected areas. Subsequently, the user may designate one of the areas as the object and the other of the areas as the shadow.

STEP 140: The user is prompted to define, and the system subsequently accepts the user's indication of, at least one shadow characteristic, such as one or more of the following shadow characteristics:

a. Dark point: Color value for the darkest points in the shadow area.
b. Bright point: Color value for the lightest points in the shadow area.
c. Brightness curve: A curve connecting the dark point and the bright point whose shape is user-selected.

Shadow color values of the shadow area pixels are computed by assigning the dark point to the shadow-object boundary, assigning the bright point to the shadow-background boundary, and employing the brightness curve to compute all locations in the shadow which do not fall on either boundary.

If the user indicates, in step 135, that a particular area within the shadow area is shadow protected, the shadow protected area will be taken into account when employing the brightness curve but will not be shadowed itself, as explained in more detail below with reference to FIGS. 3A–5B.

d. Merge factor: The relative weights assigned to the shadow color values and to the color values of the underlying original image, when the shadow color values and underlying original image color values are combined into a single image including an artificially shadowed object. For example, if the gray shadow of a bottle falls on a red table, the merge factor determines how red the bottle's shadow will appear to be.

e. Noise level: The graininess of the shadow. If a high noise level is selected, a random color value of relatively large mean magnitude is added to each shadow pixel. If a low noise level is selected, the random values added to each shadow pixel have a relatively small mean magnitude.

f. Border sharpness: If the user requests a blurry shadow border, the pixels adjacent the object-shadow border and/or adjacent the background-shadow border are smoothed, as are, optionally, the pixels adjacent the shadow protected area-shadow border, using conventional smoothing algorithms, so as to provide a smooth transition between object and shadow.

If the user does not define an individual one of the above shadow characteristics, a default value may be assigned. For example, if the user does not select a bright point, a White bright point may be employed and if the user does not select a brightness curve, a linear curve connecting the bright and dark points may be employed.

STEP 145: If the scene includes a plurality of objects for which it is desired to provide artificial shadowing, the user may elect to repeat steps 120, 130 and, optionally, 140.

STEP 150: A preview of the appearance of the scene as artificially shadowed is provided by generating and displaying a low resolution artificially shadowed image on CRT 90 of FIG. 1.

STEP 160: A high resolution artificially shadowed image and a mask therefor is generated and is stored in local memory 80.

The mask may be generated by modifying the selected mask such that:

i. The mask is transparent, within the object area defined in step 120, to the color values in the high resolution artificially shadowed image.

ii. The mask is transparent, within the shadow area defined in step 130, to the at least one color separation within which the at least one color values are defined.

iii. The mask is preferably opaque, within the shadow area, to any remaining color separations.

The mask preferably remains unchanged in the shadow protected area defined in step 135.

For example, the mask generation process may be implemented by providing a mask updating function which is capable of receiving a system input determining, for an individual region within the mask, which separations are to be transparent and which separations are to be opaque.

Explanations of how to use the above steps, including examples, are provided in Appendix A.

Reference is now made to FIGS. 3A–5B which illustrate the results of three different methods of utilizing an area 200 which intersects with an object 210, to generate an artificial shadow for an object 212. In all three methods, the dark point color value, indicated by the letter "D", is assigned to all pixels of a defined shadow area which border on the object 212. The bright point color value, indicated by the letter "B", is assigned to all remaining border pixels of the shadow area.

Figure 3A:
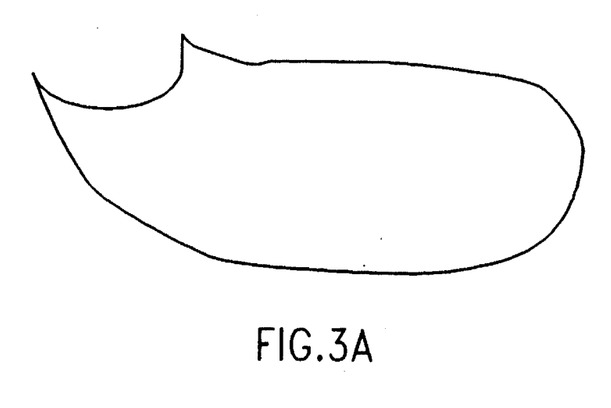
FIGS. 3A–3B are pictorial illustrations of a first method of shadowing an area which intersects with another object, and the results thereof.

According to the first method, as shown in FIG. 3A, the entire area 200 is designated as the shadow area. According to the second method, as indicated by the solid line in FIG. 4A, the shadow area is designated to be the area 200 minus the area of intersection 220 with the object 210. According to the third method, as shown in FIG. 5A, the entire area 200 is designated as the shadow area, including intersection area 220, and the object 210, including its area of intersection 220 with the area 200, is designated as a shadow protected area, as indicated by shading in FIG. 5A.

Figure 3B:
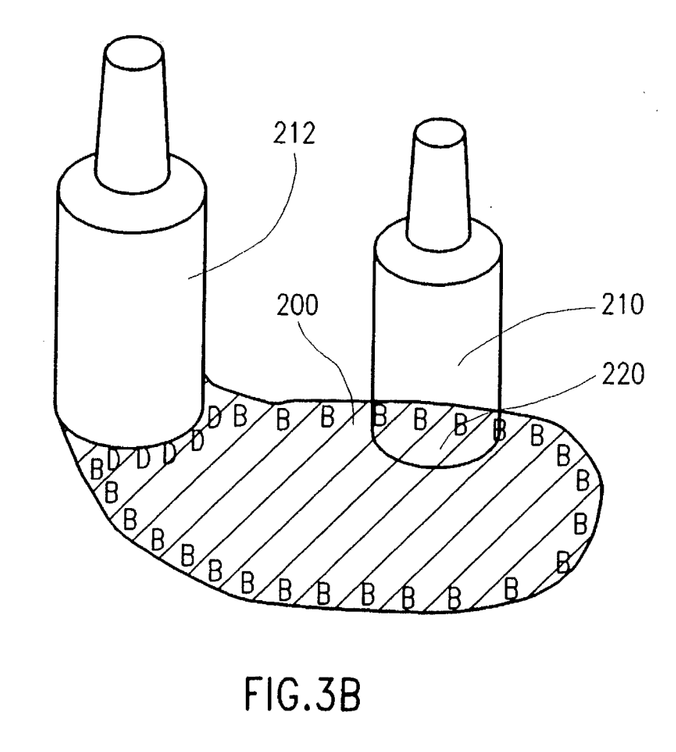
Figure 4A:
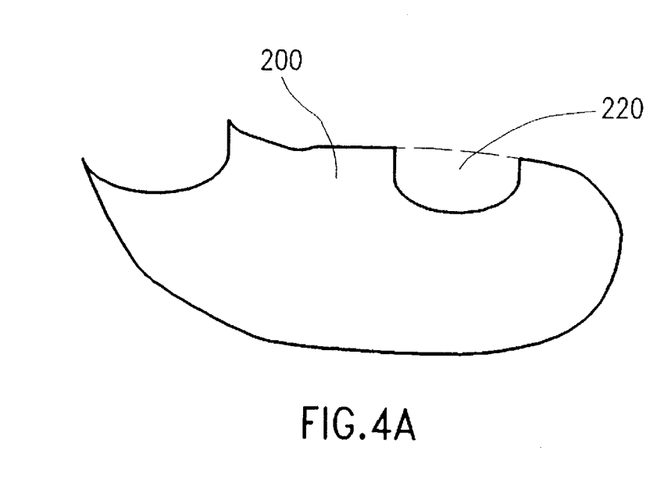
FIGS. 4A–4B are pictorial illustrations of a second method of shadowing an area which intersects with another object, and the results thereof.
Figure 4B:
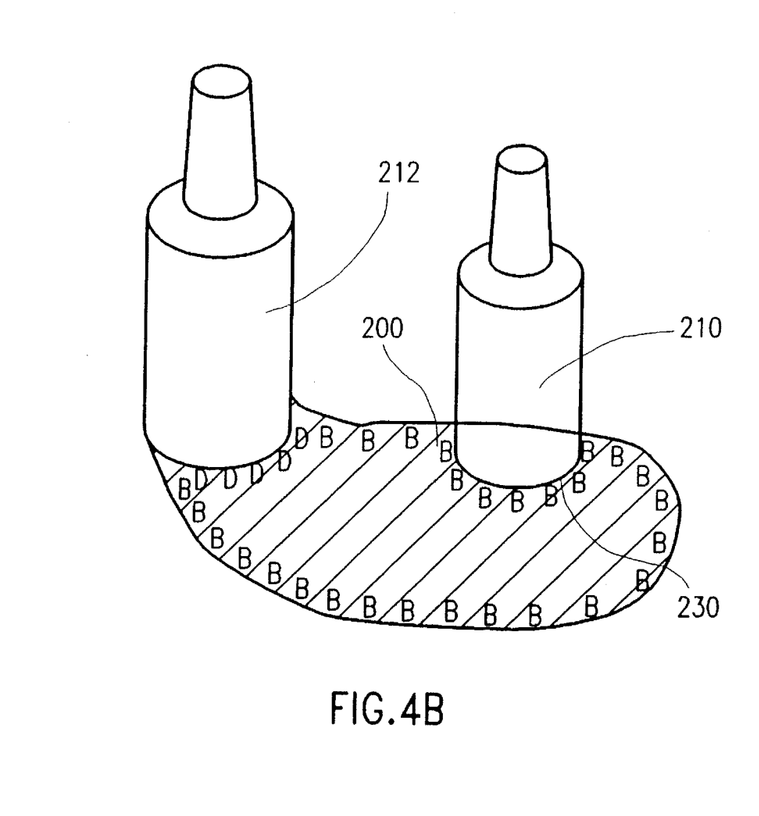
Figure 5A:
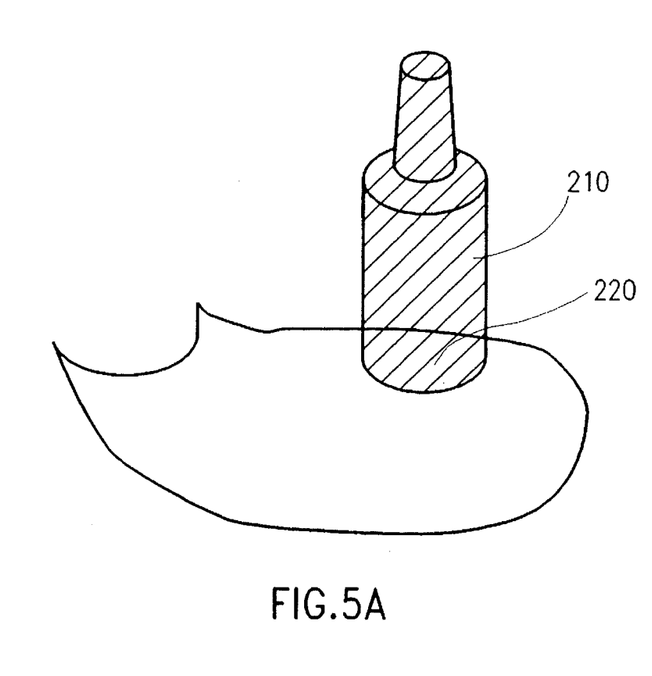
FIGS. 5A–5B are pictorial illustrations of a third method of shadowing an area which intersects with another object, and the results thereof.
Figure 5B:
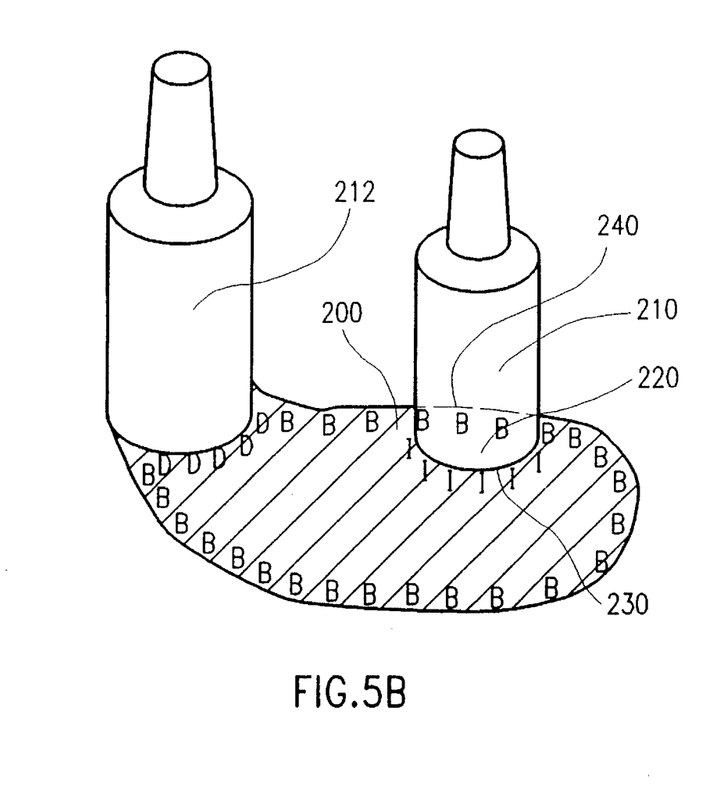

The results of employing the three methods of FIGS. 3A, 4A, and 5A, respectively, to generate artificial shadow for object 212, are shown in FIGS. 3B, 4B and 5B, respectively.

In FIG. 3B, the area of intersection 220 is shadowed, as indicated by the shading. In FIG. 4B, the area of intersection 220 is not shadowed, however, the bright edges of the shadow, as indicated by B's, fall along the border 230 of the object 210 with the area 200, which is normally not desirable. In FIG. 5B, the area of intersection 220 is not shadowed, as in FIG. 4B, however, as in FIG. 3B but in contrast to FIG. 4B, the bright edges of the shadow are, for computation purposes, taken to fall along the border 240 between area 200 and the background. Consequently, the values along the border 230 of the object 210 with the area 200 are intermediate, as indicated by I's, rather than being bright, as in FIG. 4B.

Figure 6A:
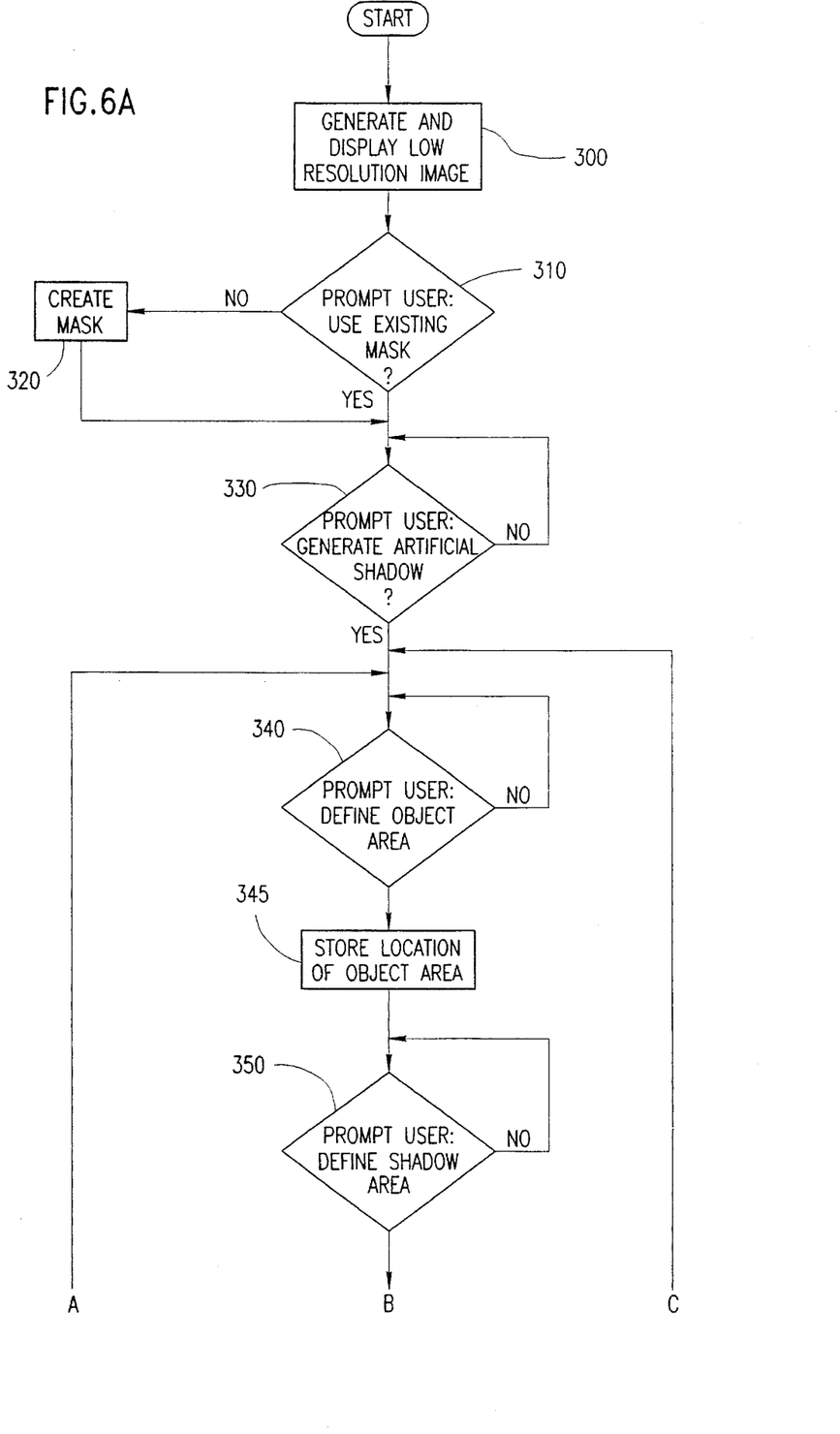
FIGS. 6A–6C, taken together, form a more detailed flowchart of the method of FIG. 2.

Reference is now made to FIG. 6A which is a more detailed flowchart complementing the flowchart of FIG. 2. The flowchart of FIG. 6A includes the following steps:

Step 300: A low resolution representation of the high resolution image selected in step 110 of FIG. 2 is generated, stored in local memory 80 of FIG. 1, and displayed on the screen 90 of FIG. 1.

Step 310: The user is prompted to indicate whether, for the purposes of steps 120, 130 and 135, he wishes to employ an existing mask or to generate a new mask for the high resolution image.

Step 320: If the user indicates that he wishes to generate a new mask, the mask is generated in step 320.

The term "mask" is here used to refer to a partition of a two-dimensional image-bearing surface into geometric regions.

Any suitable method may be employed to generate a new mask. The partition into regions may be represented in memory in any suitable format, such as in raster form or in vector form.

Step 330: The user is prompted to indicate whether or not he wishes to generate an artificial shadow for one or more objects in the high resolution image selected in 110. Typically, the artificial shadow prompt is one option in a menu including a plurality of options such as ghosting, brushing and spraying.

Steps 340, 350 and 360 provide the prompts of steps 120, 130 and 135 of the method of FIG. 2. For steps 340 and 350, the system waits until the appropriate area is defined by the user. In contrast, defining a shadow protected area is optional.

The shadow protected area may be a disjoint area including a plurality of disjoint regions.

In steps 345, 355 and 370, the locations of the object, shadow and shadow protected areas are stored in any suitable format, such as raster or vector format.

Step 380: This step is the same as step 140 in FIG. 2.

Step 390: If the user chooses to change any of the currently defined shadow characteristics, also termed herein "parameters", the newly defined shadow characteristics are stored.

Step 400: The same as step 145 of FIG. 2. If the user indicates that he does desire to shadow an additional object within the high resolution image, the method returns to step 340.

Step 410: The user is prompted to indicate whether or not he wishes to receive a screen update.

Figure 6B:
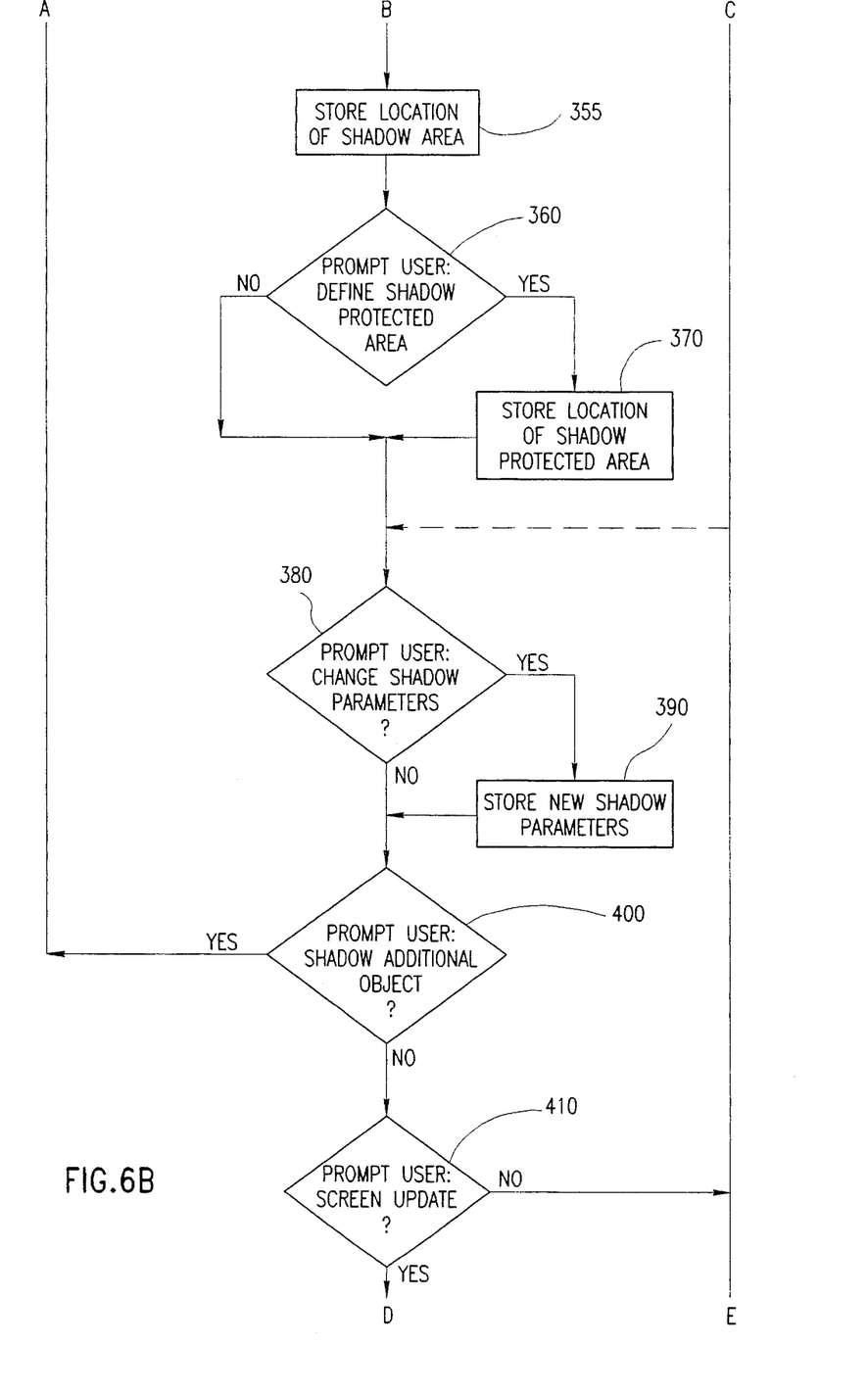

Steps 420, 430, 440 and 441 implement step 150 of FIG. 2 by modifying the low resolution image generated in step 300 by adding thereto an artificially generated shadow, in low resolution, having the currently defined shadow parameters.

In step 420, a preliminary color value is assigned to each pixel within a low resolution representation of the shadow area as follows:

Pixels which border on the object are assigned the current dark point color value.

All other border pixels are assigned the current bright point color value.

All interior pixels are assigned a value intermediate the current bright and dark color values, according to a value along the current brightness curve, which value is determined by the relationship between the distance of the individual interior pixel from the nearest bright color value and the distance of the same individual interior pixel from the nearest dark color value.

For example, the following equation may be used to assign a color value C to each pixel within the low resolution representation of the shadow area:

$$C = V_b \, LUT\left(\frac{d_a}{d_a + d_b}\right) + V_a \, LUT\left(\frac{d_b}{d_a + d_b}\right)$$

where:

$d_a$=distance from an adjacent "dark" contour, such as the border between the shadow and the object;

$d_b$=distance from an adjacent "bright" contour, such as the border between the shadow and the background;

$V_a$=the current dark color value;

$V_b$=the current bright color value;

LUT (x)=In a LUT, constructed to store the current brightness curve, the output value found at LUT address x. Typically, LUT (0)=0, LUT (1)=1.

In step 430, the preliminary color values computed in step 420 are modified by adding a randomly generated noise value whose mean is zero and whose variance is selected to correspond to the current noise level.

In step 440, for each pixel within the low resolution representation of the shadow area, final color values are computed by combining the modified color values computed in step 430 with the color values of the low resolution image generated in step 300, in accordance with the current merge factor. For example, the final color values may be computed as a weighted average of the modified color values and the underlying low resolution image values, wherein the weighting is determined by the current merge factor.

In step 441, the borders between the low resolution representations of the shadow and the object and between the low resolution representations of the shadow and the shadow protected area are blurred according to the magnitude of border sharpness selected by the user in step 140 of FIG. 2. Optionally, the border between the low resolution representations of the shadow and the background is also blurred.

The new blurred color values may be computed by using a suitable convolution matrix, such as the following 3×3 convolution matrix:

| 1/9 | 1/9 | 1/9 |
|-----|-----|-----|
| 1/9 | 1/9 | 1/9 |
| 1/9 | 1/9 | 1/9 |

Figure 6C:
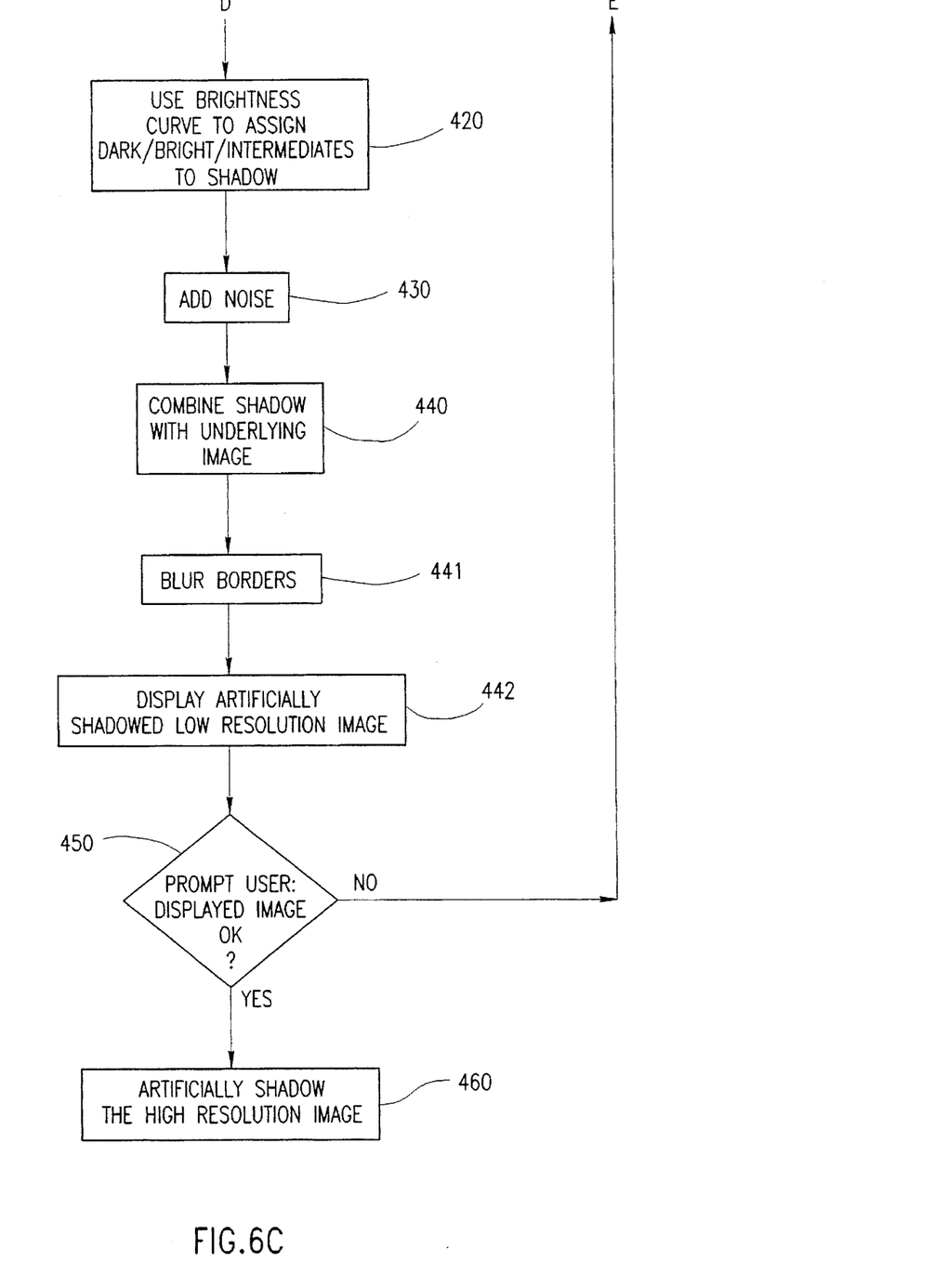

In step 442, the low resolution image including the newly modified shadow area is displayed on the screen 90 of FIG. 1.

In step 450, the user is prompted to indicate whether the image displayed in step 442 is satisfactory. If not, the user is returned to step 340 or, alternatively, to step 380.

In step 460, step 160 of FIG. 2 is implemented by modifying the high resolution image selected in step 110 of FIG. 2, by adding thereto an artificially generated shadow in high resolution, having the currently defined shadow parameters. Step 460 may comprise the steps 420, 430, 440 and 441, except that these steps are performed in high resolution and for the high resolution representation rather than in low resolution and for the low resolution representation.

Also, the existing mask identified in step 310 or created in step 320 is modified as described above with reference to step 160 of FIG. 2.

It is appreciated that various features of the invention which are, for clarity, described in the contexts of separate embodiments may also be provided in combination in a single embodiment. Conversely, various features of the invention which are, for brevity, described in the context of a single embodiment may also be provided separately.

It will be appreciated by persons skilled in the art that the present invention is not limited to what has been particularly shown and described hereinabove. Rather, the scope of the present invention is defined only by the claims that follow:

We claim:

1. A method for producing a two dimensional color image with an artificial shadow, said image having elements stored in at least a first two dimensional format and in a second two dimensional format, the method comprising:

receiving a user input comprising at least an area in said two dimensional image in which the object to be shadowed resides, an area in said two dimensional image in which the shadow is to be generated and at least one shadow characteristic;

generating in accordance with said user input a two dimensional artificial shadow;

manipulating elements stored in said first two dimensional format in accordance with said artificial shadow, said user input and said second format;

manipulating elements stored in said second two dimensional format in accordance with said user input; and defining a relationship between said manipulated elements in said first two dimensional format and the manipulated elements in said second two dimensional format, and generating said two dimensional image with the artificial shadow, based on said relationship.

2. A method according to claim 1 wherein said at least one shadow characteristic is selected from the group consisting of a dark point, a bright point, a brightness curve, a shadow-underlying image combining factor and a graininess factor.

3. A method according to claim 1 comprising forming said first and second formats are continuous tone and line work, respectively.

4. A method according to claim 1 wherein said step of receiving a user input further comprises receiving a user indication of at least one shadow protected area within said area to be shadowed, such that said area to be shadowed has at least one shadow protected area and at least two shadow unprotected areas, and wherein said step of generating an artificial shadow further comprises generating said artificial shadow in accordance with an outer boundary formed by said at least one shadow protected area and said at least two shadow unprotected areas;

said step of manipulating elements stored in said first format comprises manipulating said elements in accordance with at least one shadow protected area;

said step of manipulating elements stored in said second format comprises manipulating said elements in accordance with at least one said shadow protected area; and said step of defining a relationship between said manipulated elements in said first format and said manipulated elements in said second format comprises defining said relationship with said at least one shadow protected area and said at least two shadow unprotected areas.

5. A system for producing a two dimensional color image with an artificial shadow, said image having elements stored at least in a first two dimensional format and in a second two dimensional format, said system comprising:

means for receiving a user input, said user input comprising at least an area in said image in which the object to be shadowed resides, an area in said image in which the shadow is to be generated and at least one shadow characteristic;

means for generating an artificial shadow in accordance with said user input;

means for manipulating elements stored in said first two dimensional format in accordance with said artificial shadow, said user input and said second format;

means for manipulating elements stored in said second two dimensional format in accordance with said user input; and means for defining a relationship between the manipulated elements in said first two dimensional format and the manipulated elements in said second two dimensional format to generate said two dimensional image with the artificial shadow.

6. A system according to claim 5 wherein said at least one shadow characteristic is selected from the group consisting of a dark point, a bright point, a brightness curve, a shadow-underlying image combining factor and a graininess factor.

7. A system according to claim 5 wherein said first and second formats are continuous tone and line work, respectively.

8. A system according to claim 5 wherein said means for receiving user input comprises means for receiving a user indication within said area to be shadowed of at least one of shadow protected area and at least two shadow unprotected areas, and wherein said means for generating an artificial shadow generates said artificial shadow in accordance with an outer boundary formed by said plurality of shadow protected areas and said shadow unprotected areas;

said means for manipulating elements stored in said first format comprises means for manipulating the elements in accordance with at least one shadow protected area;

said means for manipulating elements stored in said second format comprises means for manipulating the elements in accordance with said at least one shadow protected area; and said means for defining a relationship between the manipulated elements in said first format and the manipulated elements in said second format comprises means for defining said relationship with said at least one shadow protected area and said at least two shadow unprotected areas.

* * * * *